No. 864,437. PATENTED AUG. 27, 1907.
E. SUTHERLAND.
WEIGHING SCALE.
APPLICATION FILED DEC. 19, 1906.
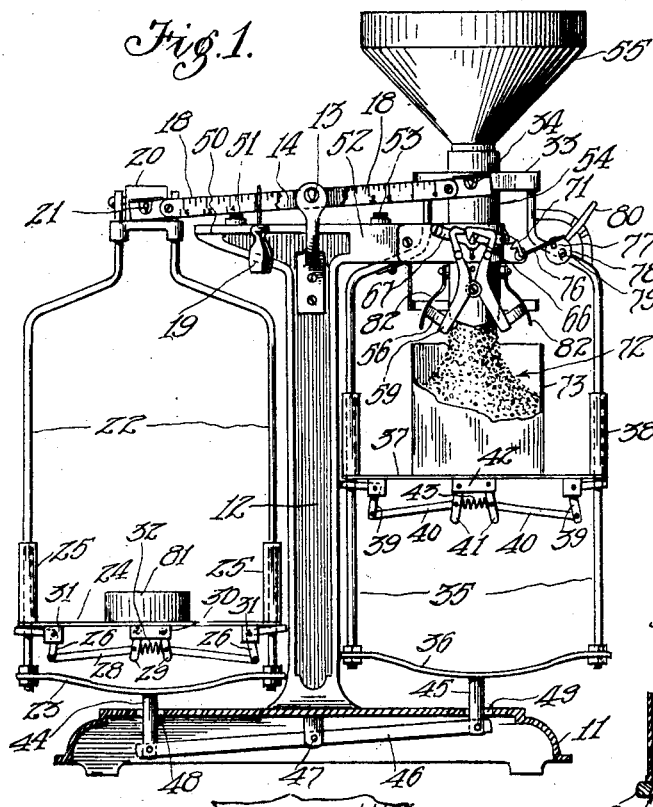
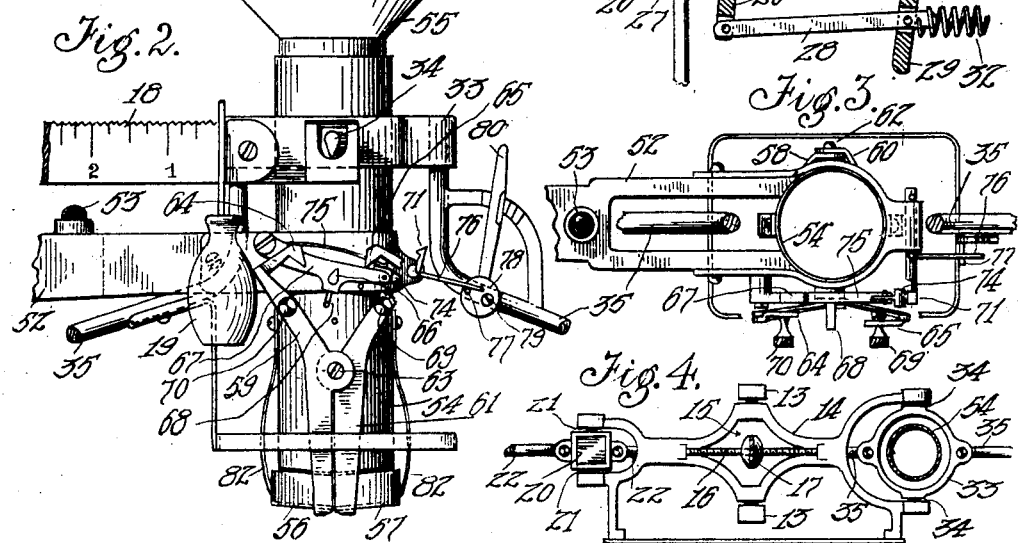
Witnesses.
Inventor.
Emil Sutherland,
By Hazard & Harpham
Attorneys.

UNITED STATES PATENT OFFICE.

EMIL SUTHERLAND, OF LOS ANGELES, CALIFORNIA, ASSIGNOR TO SUTHERLAND AUTOMATIC SCALE COMPANY, OF LOS ANGELES, CALIFORNIA, A CORPORATION OF CALIFORNIA.

WEIGHING-SCALE.

No. 864,437.

Specification of Letters Patent.

Patented Aug. 27, 1907.

Application filed December 19, 1906. Serial No. 348,548.

*To all whom it may concern:*

Be it known that I, EMIL SUTHERLAND, a citizen of the United States, residing at Los Angeles, in the county of Los Angeles and State of California, have invented new and useful Improvements in Weighing-Scales, of which the following is a specification.

My invention relates to a scale for weighing pulverized material in a dry state, such as coffee, beans, sugar, and other like materials and the object thereof is to provide a scale which will automatically cut off the flow of the material being weighed as soon as the desired quantity is in the packing receptacle. I accomplish this object by the mechanism described herein and illustrated in the accompanying drawings in which:—

Figure 1—is a side elevation partly broken away of my improved scale. Fig. 2— is an enlarged view of a portion of the mechanism shown in Fig. 1. Fig. 3— is a plan of a portion of the top. Fig. 4— is a plan of a portion of the upper part of the scale showing the balance adjusting mechanism. Fig. 5— is a detail of the cut-off gates. Fig. 6— is a detail of the platform adjusting mechanism.

Referring to the drawings 11 indicates a suitable base to which is secured in any suitable manner a standard 12.

Secured to the upper portion of the standard is a bracket 13 to which is secured a scale beam 14. The outer ends of this scale beam are bifurcated as best shown in Fig. 4 and in the center thereof there is preferably an aperture 15 extending therethrough. Secured to the scale beam and extending across the aperture is a threaded adjusting rod 16 on which is mounted a nut 17 which operates as an adjusting or balancing weight, as it can be thrown on either side of the pivotal point of connection between the scale beam and the bracket in which it is mounted to balance the beam. On one side of the scale beam is the weight beam 18 on which is slidably mounted the usual beam weight 19 which will enable the operator to weigh the smaller packages as hereafter explained. In one of the furcations of the scale beam is mounted the carrying frame which consists of the head block 20 having bearing lugs 21 which rest upon the scale beam and are knife bearings, the depending rods 22 which are secured to the head block, the binding bar 23 which unites the bottom of the depending rods, the platform 24 having hollow sleeves 25 secured thereto and the locking mechanism below the platform which consists of a bell crank lever 26 having an aperture 27 therein, link bar 28 secured to the other arm of the bell crank lever and the operating lever 29 which is pivotally secured to the other end of the link and to a lug 30 secured to the bottom of the platform. The bell crank lever 26 is secured in bearings 31 also secured to the bottom of the platform. The other side of the locking mechanism consists of like parts similarly mounted and through the apertures in the bell crank lever the depending rods 22 pass as best shown in detail in Fig. 6. Between these locking members is a spring 32 which causes the bell crank levers to engage the depending rods to lock the weight platform at any desired elevation. In the furcations of the other end of the scale beam is mounted the frame which supports the material that is being weighed. This frame consists of a head frame 33 having bearing lugs 34 which rest upon the scale beam and knife bearings, the depending rods 35 which are secured to the head frame, of the binding bar 36 which unites the bottom of the depending rods, the platform 37 having hollow sleeves 38 secured thereto and the locking mechanism below the platform which consists of a bell crank lever 39 link bar 40 secured to the outer end of the bell crank lever and the operating lever 41 which is pivotally secured to the other end of the link and to a lug 42 secured to the bottom of the platform. These bell crank levers have apertures therein through which extend the depending rods 35 and are of the same construction and operation as shown in detail in Fig. 6. Spring 43 holds the members in their locked position.

To the bottom of binding bar 23 is a lug 44 and to the bottom of binding bar 36 is a lug 45 and these lugs are connected together by the steadying bar 46 which is pivoted in bearing 47 secured to the base, the purpose of these lugs and steadying bar being to steady the bottom of the respective frames and to keep them central below their respective bearings. Steadying bar 46 is placed within the base which is hollow and lugs 44 and 45 pass to apertures 48 and 49 in the base. On the top of standard 12 is an arm 50 that is provided with a stop 51 to limit the downward movement of that end of the scale beam. On the opposite side the standard is provided with an arm 52 provided with a stop 53 which limits the downward movement of the scale beam on that side. The outer end of arm 52 is preferably bifurcated as shown in Fig. 3 and within these furcations and secured to the arm is the delivery chute 54 which passes upwardly within and to a point above head frame 33. In the top of this delivery chute may be removably secured a hopper 55 in which is placed the material that is to be weighted, the bottom of this receptacle being open. In the drawings I have shown delivery chute as being circular but any other form may be used and the bottom thereof is closed by gates 56 and 57 which are provided with upwardly extending arms 58, 59, 60 and 61. Arms 58 and 60 are shorter than arms 59 and 61 and are secured to the delivery chute by a screw 62 on which they turn as hereafter explained. Arms 59 and 61 are secured to the delivery chute by a screw 63 on which they likewise turn. The points of attachment of these respective arms are on opposite sides of the delivery chute and the upper ends of arms 59 and 61 curve away from each other and also away from the delivery chute. At the upper ends of these arms are the oppositely disposed holding hooks 64 and 65 which are offset as to each other so that when the gates are open as shown in Fig. 1 they will pass each other and engage lug 66 on the side of locking lever 67 which last lever is pivotally secured to arm 52 when said lever is moved upwardly. The upward movement of the free end of the locking lever is caused by the upper end of arm 59 coming in contact with an L-shaped arm 68 secured to the lower side of the locking lever. The upper ends of arms 59 and 61 are provided with studs 69 and 70 and when it is desired to open the gates, the operator places his thumb and finger upon these studs and presses them together. As the upper ends of these arms swing together the upper end of arm 59 engages the L-shaped arm on the lower side of the locking bar and moves the free end thereof upwardly thereby carrying lug 66 between the holding hooks 64 and 65 which then rest on opposite sides of the lug. At this time the free end of the locking bar passes above the trip bar 71 and rests thereon as shown in Fig. 1 thereby holding the gates in their open position and permitting the material 72 which is to be weighed to pass into the receptacle 73 which rests upon the platform 37.

In the end of the locking lever is a trigger 74 which is so mounted that when the locking bar is moved upwardly the trigger will engage the end of the trip bar and will turn downwardly until the same has passed the end of the trip bar when spring 75 which bears on the rear end of the trigger will bring the trigger back to the position shown in Figs. 1 and 2 and when the operator removes his hand the trigger will engage the trip bar as shown in Fig. 1 and the locking bar will be prevented from descending any lower, thereby preventing the gates of the delivery chute from closing, keeping them in the position shown in Fig. 1. The trip bar is revolubly mounted in bearings and is provided with an arm 76 which rests upon a pin 77, which pin is carried by disk 78. Disk 78 is eccentrically mounted by pivot 79 to one of the depending rods 35 and is provided with a regulating handle 80 by means of which the position of the pin 77 can be changed so as to make the contact between the trigger and the trip bar light or heavy according to the material that is being weighed, heavy contact being required when dense, heavy material is being weighed.

As soon as the required amount of material is in the receptacle to counter-balance weights 81 and the sliding weight 19 that end of the scale beam will be depressed and the other end will rise. This movement will carry pin 77 with it, thereby permitting the trip bar to move out of the road of the locking bar which will then fall and springs 82 will then force the gates inwardly to close the lower end of the delivery chute and cut off the flow of material therethrough. The package is then removed from the platform and an empty package is put thereon when the gates are again opened and will be locked open as before explained because the removal of the filled package will cause the package platform to be returned to its uppermost position as shown in Fig. 1 in which the trip bar is held so as to engage the trigger of the locking bar as the same is moved downwardly after having been thrown above the same by the opening of the gates.

Having described my invention what I claim is:—

1. The combination with a weighing mechanism, of a hopper provided with a delivery chute arranged over the weighing platform of the weighing mechanism; a pair of gates provided with arms pivotally secured to the sides of said chute intermediate their ends, said arms being provided at their upper ends with inwardly extending hooks; a locking bar pivotally secured at one end and having a trigger in the free end thereof, and a lug projecting from the side thereof adapted to be engaged by the hooks of the gate arms to lock the gates open; and mechanism operable by the weighing mechanism to unlock said locking bar.

2. A weighing mechanism, comprising a base; a standard secured thereto, said standard having an arm at the top thereof; bearings secured to the upper end of said standard and projecting upwardly and above said arm; a scale beam pivotally and centrally mounted in said bearings; balancing means secured to said scale beam; a weight beam secured to said scale beam; a sliding weight on said weight beam; a weight carrying frame secured to one end of said scale beam; a package carrying frame secured to the other end of said scale beam; a delivery chute secured to the arm of said standard over said package carrying frame; spring operated cut off mechanism secured to said delivery chute adapted to control the passage of material therethrough; mechanism secured to said cut off mechanism and mechanism secured to the arm of the standard and mechanism secured to the package carrying frame which when co-acting will hold the cut off mechanism in its open position until a predetermined amount of material has reached and rests upon the package carrying frame and will then co-act to release the cut off mechanism, whereby the further flow of material to the package carrying frame is cut off.

3. A weighing mechanism, comprising a base; a standard secured thereto having an arm at the top thereof; bearings secured to the upper ends of said standard and projecting upwardly above said arm; a scale beam pivotally and centrally mounted in said bearings; a weight carrying frame secured to one end of said scale beam; a package carrying frame secured to the other end of said scale beam; a delivery chute secured to the arm of said standard over said package carrying frame; a pair of spring operated cut off gates having upwardly extending arms pivotally secured to the sides of said chute intermediate their ends, said arms being provided at their upper ends with inwardly and downwardly extending hooks; a locking bar pivotally secured at one end to the arm of said standard, said locking bar having a trigger in the free end thereof and a lug projecting from the side thereof, said lug being adapted to be engaged by the hooks of the gate arms to hold the gates open when the locking bar is locked; a trip bar revolubly mounted in bearings secured to the delivery chute, said trip bar being adapted to be engaged by the trigger of the locking bar, said trigger being so mounted as to pass said trip bar in its upward movement, but to engage the trip bar in its downward movement when the trip bar is locked; an arm secured to said trip bar; a pin secured to the weighing frame and movable therewith, said pin being adapted to hold the arm of the trip bar in engagement with the trigger of the locking bar until the predetermined amount of material rests upon the weighing frame and then to release the trip bar from engagement with the locking bar.

In witness that I claim the foregoing I have hereunto subscribed my name this 13th day of December, 1906.

EMIL SUTHERLAND.

Witnesses:
G. E. HARPHAM,
EDMUND A. STRAUSE.